US012691390B2

(12) United States Patent
Naaman et al.

(10) Patent No.: US 12,691,390 B2
(45) Date of Patent: Jul. 28, 2026

(54) ENANTIO-SPECIFIC CRYSTALLIZATION SYSTEM AND METHOD THEREOF

(71) Applicants: Yeda Research and Development Co. Ltd, Rehovot (IL); Yosef Paltiel, Rehovot (IL)

(72) Inventors: Ron Naaman, Yarkona (IL); Francesco Tassinari, Rehovot (IL); Yutao Sang, Rehovot (IL); Kakali Santra, Rehovot (IL); Debkumar Bhowmick, Rehovot (IL)

(73) Assignees: YEDA RESEARCH AND DEVELOPMENT CO. LTD, Rehovot (IL); Yosef Paltiel, Rehovot (IL)

( * ) Notice: Subject to any disclaimer, the term of this patent is extended or adjusted under 35 U.S.C. 154(b) by 820 days.

(21) Appl. No.: 17/910,436

(22) PCT Filed: Mar. 11, 2021

(86) PCT No.: PCT/IL2021/050267
§ 371 (c)(1),
(2) Date: Sep. 9, 2022

(87) PCT Pub. No.: WO2021/181393
PCT Pub. Date: Sep. 16, 2021

(65) Prior Publication Data
US 2024/0181371 A1 Jun. 6, 2024

Related U.S. Application Data

(60) Provisional application No. 62/988,031, filed on Mar. 11, 2020.

(51) Int. Cl.
*B01D 9/00* (2006.01)
*B01D 9/02* (2006.01)

(52) U.S. Cl.
CPC .......... *B01D 9/0063* (2013.01); *B01D 9/0009* (2013.01); *B01D 9/005* (2013.01); *B01D 9/02* (2013.01); *B01D 2009/0086* (2013.01)

(58) Field of Classification Search
None
See application file for complete search history.

(56) References Cited

U.S. PATENT DOCUMENTS

| | | | | |
|---|---|---|---|---|
| 5,523,064 A | * | 6/1996 | Schranz | B01D 9/0013 |
| | | | | 422/245.1 |
| 6,315,966 B1 | * | 11/2001 | Baumgard | B01D 9/0036 |
| | | | | 422/258 |

(Continued)

FOREIGN PATENT DOCUMENTS

| | | |
|---|---|---|
| JP | 2003071203 A | 3/2003 |
| WO | 03099411 A1 | 12/2003 |
| WO | 2019043693 A1 | 3/2019 |

OTHER PUBLICATIONS

A. Collins, G. N. Sheldrake, J. Crosby, The Commercial Manufacture and Applications of Optically Active Compounds, Reprint, Wiley, Chichester, 2000.

(Continued)

*Primary Examiner* — John J Figueroa
(74) *Attorney, Agent, or Firm* — CANTOR COLBURN LLP

(57) ABSTRACT

The present invention relates to a technique for flow crystallization. The system comprises a container having a bottom surface defining a first plane, the container including at least two planar magnetic surfaces being arranged in a spaced-apart manner along a first plane and being substantially parallel to a second plane; a magnetization vector of each of the magnetic surfaces being perpendicularly to the surface, wherein the container is configured such that the first plane is substantially perpendicular to the second (Continued)

plane; wherein a cavity formed in between the planar magnetic surfaces is configured to accommodate a racemic mixture including different enantiomers such that each magnetic surface interacts differently with each of the different enantiomers to thereby enable enantio-selective crystallization. Therefore, the system of the present invention is based on enantio-separation of the crystals using magnetic surfaces.

16 Claims, 14 Drawing Sheets

(56) References Cited

U.S. PATENT DOCUMENTS

| | | | | |
|---|---|---|---|---|
| 8,252,120 B2 * | 8/2012 | Nordhoff | | B01D 9/0045 |
| | | | | 134/13 |
| 2014/0099238 A1 | 4/2014 | Huang | | |
| 2016/0193544 A1 * | 7/2016 | Heinzl | | B01D 9/0031 |
| | | | | 210/640 |
| 2020/0353478 A1 * | 11/2020 | Naaman | | B01D 9/0072 |
| 2023/0301200 A1 * | 9/2023 | Gazit | | H10N 50/20 |
| | | | | 365/158 |

OTHER PUBLICATIONS

A. Kumar, E. Capua, M.K. Kesharwani, J.M.L. Martin, E. Sitbon, D.H. Waldeck, R. Naaman, Chirality-induced spin polarization places symmetry constraints on biomolecular interactions. PNAS 2017, 114, 2474.

A. Lewis, M. Seckler, H. J. M. Kramer, G. van Rosmalen, Industrial Crystallization: Fundamentals and Applications; Cambridge University Press, Cambridge, 2015.

A. Svang-Ariyaskul, W. J. Koros, R. W. Rousseau, Chiral separation using a novel combination of cooling crystallization and a membrane barrier: Resolution of DL-glutamicacid, Chemical Engineering Science 64, 1980-1984 (2009).

A. Ziv, A. Saha, H. Alpern, N. Sukenik, L. T. Baczewski, S. Yochelis, M. Reches, Y. Paltiel, Adv. Mater. 2019, 31 (40), 1904206.

A.M. Rouhi, Chem. Eng. News 2003, 81 (18), 45-61.

E. Francotte, W. Lindner, Chirality in Drug Research; Wiley-VCH: Weinheim, 2006.

F. Tassinari, J. Steidel, S. Paltiel, C. Fontanesi, M. Lahav, Y. Paltiel, R. Naaman, Chemical Science 2019, 10 (20), 5246-5250.

G. Coquerel, in Novel Optical Resolution Technologies (Eds: K. Sakai, N. Hirayama, R. Tamura), Springer Berlin Heidelberg, Berlin, Heidelberg, 2006, pp. 1-51.

H. H-Tung, Crystallization of Organic Compounds: An Industrial Perspective, Wiley, Hoboken, N.J, 2009.

International Search Report for International Application No. PCT/IL2021/050267, International Filing Date Mar. 11, 2021, Date of Mailing Aug. 18, 2021, 1 page.

J. Gal, Pasteur and the art of chirality. Nat. Chem. 2017, 9, 604.

K. Banerjee-Ghosh, O. Ben Dor, F. Tassinari, E. Capua, S. Yochelis, A. Capua, S. H. Yang, S. S. P. Parkin, S. Sarkar, L. Kronik, L. T. Baczewski, R. Naaman, Y. Paltiel, Science 2018, 360 (6395), 1331-1334.

O. Ben Dor, S. Yochelis, A. Radko, K. Vankayala, E. Capua, A. Capua, S.-H. Yang, et al., Magnetization switching in ferromagnets by adsorbed chiral molecules without current or external magnetic field. Nat. Comm. 2017, 8, 14567.

R. Naaman, Y. Paltiel, D. H. Waldeck, J. Phys. Chem. Lett. 2020, 11 (9), 3660-3666.

S. T. Hayes, G. Assaf, G. Checksfield, C. Cheung, D. Critcher, L. Harris, R. Howard, S. Mathew, C. Regius, G. Scotney, A. Scott, Org. Process Res. Dev. 2011, 15 (6), 1305-1314.

* cited by examiner

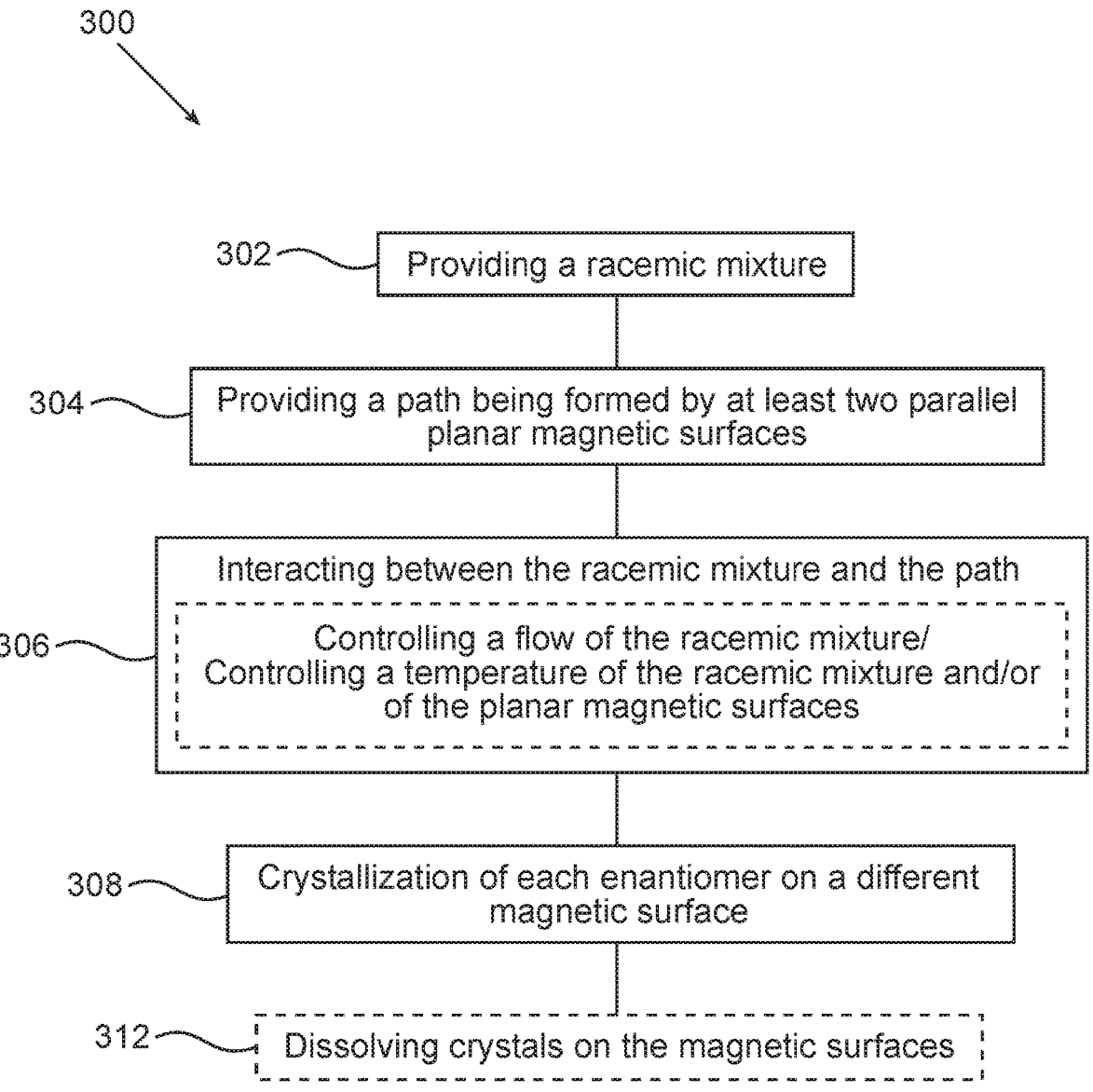

300

302 — Providing a racemic mixture

304 — Providing a path being formed by at least two parallel planar magnetic surfaces 306 — Interacting between the racemic mixture and the path Controlling a flow of the racemic mixture/
Controlling a temperature of the racemic mixture and/or of the planar magnetic surfaces 308 — Crystallization of each enantiomer on a different magnetic surface 312 — Dissolving crystals on the magnetic surfaces

Fig. 2

ENANTIO-SPECIFIC CRYSTALLIZATION SYSTEM AND METHOD THEREOF

CROSS REFERENCE TO RELATED APPLICATIONS

This application is a US National Stage application of PCT/IL2021/050267, file d Mar. 11, 2021, which claims the benefit of U.S. Provisional Application No. 62/988,031, filed Mar. 11, 2020, both of which are incorporated by reference in their entirety herein.

TECHNOLOGICAL FIELD

The present invention relates to the field of separation enantiomers by crystallization, and in addition to a technique for providing a crystallization system.

BACKGROUND ART

References considered to be relevant as background to the presently disclosed subject matter are listed below:

[1] J. Gal, Pasteur and the art of chirality. Nat. Chem. 2017, 9, 604.

[2] A. Svang-Ariyaskul, W. J. Koros, R. W. Rousseau, Chiral separation using a novel combination of cooling crystallization and a membrane barrier: Resolution of DL-glutamicacid, Chemical Engineering Science 64, 1980-1984 (2009).

[3] A. Kumar, E. Capua, M. K. Kesharwani, J. M. L. Martin, E. Sitbon, D. H. Waldeck, R. Naaman, Chirality-induced spin polarization places symmetry constraints on biomolecular interactions. PNAS 2017, 114, 2474.

[4] O. Ben Dor, S. Yochelis, A. Radko, K. Vankayala, E. Capua, A. Capua, S.-H. Yang, L. T. Baczewski, S. S. P. Parkin, R. Naaman, Y. Paltiel, Magnetization switching in ferromagnets by adsorbed chiral molecules without current or external magnetic field. Nat. Comm. 2017, 8, 14567.

[5] A. M. Rouhi, Chem. Eng. News 2003, 81 (18), 45-61.

[6] E. Francotte, W. Lindner, Chirality in Drug Research; Wiley-VCH: Weinheim, 2006.

[7] G. Coquerel, in Novel Optical Resolution Technologies (Eds: K. Sakai, N. Hirayama, R. Tamura), Springer Berlin Heidelberg, Berlin, Heidelberg, 2006, pp 1-51.

[8] H. H-Tung, Crystallization of Organic Compounds: An Industrial Perspective, Wiley, Hoboken, N.J, 2009.

[9] A. Lewis, M. Seckler, H. J. M. Kramer, G. van Rosmalen, Industrial Crystallization: Fundamentals and Applications; Cambridge University Press, Cambridge, 2015.

[10] A. Collins, G. N. Sheldrake, J. Crosby, The Commercial Manufacture and Applications of Optically Active Compounds, Reprint, Wiley, Chichester, 2000.

[11] S. T. Hayes, G. Assaf, G. Checksfield, C. Cheung, D. Critcher, L. Harris, R. Howard, S. Mathew, C. Regius, G. Scotney, A. Scott, Org. Process Res. Dev. 2011, 15 (6), 1305-1314.

[12] F. Tassinari, J. Steidel, S. Paltiel, C. Fontanesi, M. Lahav, Y. Paltiel, R. Naaman, Chemical Science 2019, 10 (20), 5246-5250.

[13] R. Naaman, Y. Paltiel, D. H. Waldeck, J. Phys. Chem. Lett. 2020, 11 (9), 3660-3666.

[14] K. Banerjee-Ghosh, O. Ben Dor, F. Tassinari, E. Capua, S. Yochelis, A. Capua, S. H. Yang, S. S. P. Parkin, S. Sarkar, L. Kronik, L. T. Baczewski, R. Naaman, Y. Paltiel, Science 2018, 360 (6395), 1331-1334.

[15] A. Ziv, A. Saha, H. Alpern, N. Sukenik, L. T. Baczewski, S. Yochelis, M. Reches, Y. Paltiel, Adv. Mater. 2019, 31 (40), 1904206.

Acknowledgement of the above references herein is not to be inferred as meaning that these are in any way relevant to the patentability of the presently disclosed subject matter.

BACKGROUND

Crystallization occurs in two major steps. The first is nucleation, the appearance of a crystalline phase from either a supercooled liquid or a supersaturated solvent. The second step is known as crystal growth, which is the increase in the size of particles and leads to a crystal state. More specifically, in the nucleation step, the solute molecules or atoms dispersed in the solvent start to gather into clusters, on the microscopic scale (elevating solute concentration in a small region). The clusters need to reach a critical size in order to become stable nuclei. Such critical size is dictated by many different factors (temperature, concentration, etc.). The crystal growth is the subsequent size increase of the nuclei that succeed in achieving the critical cluster size. Crystal growth is a dynamic process occurring in equilibrium where solute molecules or atoms precipitate out of solution, and dissolve back into solution.

Crystal formation can be achieved by various methods, such as cooling, evaporation, addition of a second solvent to reduce the solubility of the solute (a technique known as antisolvent or drown-out), solvent layering, sublimation, changing the cation or anion, as well as other methods. The formation of a supersaturated solution does not guarantee crystal formation, and often a seed crystal or scratching the glass is required to form nucleation sites. A typical laboratory technique for crystal formation is to dissolve the solid in a solution in which it is partially soluble, usually at high temperatures, to obtain supersaturation. The hot mixture is then filtered to remove any insoluble impurities. The filtrate is allowed to slowly cool. Crystals that form are then filtered and washed with a solvent in which they are not soluble but is miscible with the mother liquor. The process is then repeated to increase the purity in a technique known as recrystallization.

For biological molecules in which the solvent channels continue to be present to retain the three-dimensional structure intact, microbatch crystallization under oil and vapor diffusion [2] methods have been the common methods.

Most biological systems are composed of molecules of a single chirality, therefore producing of enantio-pure chemicals is of importance to the pharma and agro-related industries. Since the manual resolution of the enantiomorphous crystals of salts of tartaric acids by Pasteur [1], crystallization emerged as an important method for separating enantiomers. Despite the development of several other strategies for obtaining chiral resolution, chiral separation by crystallization is the most important in large scale productions due to its simplicity.

There are two main chiral crystallization methods, diastereomeric crystallization and direct crystallization. Resolution through diastereomeric crystallization is broadly used in industry, especially the pharmaceutical industry, to produce most chiral drugs that are not derived from natural products. Diastereomeric crystallization is a process in which an enantiomer is converted to a diastereomer, which is a stereomer that is not a mirror image of the other, prior to being crystallized [2]. Direct crystallization is an alternative technique, showing real economic importance in industry.

As mentioned above, crystallization is the most commonly used technique for the separation and purification of enantiopure molecules from a racemic mixture, whether it is by formation of a diastereomer by addition of a resolution agent [5] or by spontaneous resolution in case of conglomerates [6,7]. Industrially it has a great importance, as most of the active pharmaceuticals' ingredients have in their preparation at least one crystallization step [9,10]. Since many enantiomeric drugs have different biological effects for the two enantiomers [II], regulatory bodies are aiming for the development and commercialization of enantiopure active molecules rather than their racemic form, giving even more importance to the development of efficient resolution techniques.

GENERAL DESCRIPTION

Several challenges exist in the process of direct crystallization. First, filtration must be carried out often and multiple tanks are necessary, which increases the size of the set up and the length of the process. Second, the crystallizers must be heated and cooled several times, which is not energy efficient.

A concept was introduced which is related to interactions between magnets and chiral molecules [12] and also described in International publication patent No. WO 19/043693 assigned to the same assignee of the present patent application. Tassinari et al. [13] shows that the preferential crystallization of a conglomerate could be directed towards one enantiomer or the other using a magnetized surface as the crystallization substrate. This concept is based on the observation that charge polarization in chiral molecules is accompanied by spin polarization [3] and by the realization that the polarized spin in the chiral molecule interacts in an enantiospecific manner with ferromagnets (FM) that have their spin aligned perpendicular to their surface [4]. It is important to realize that the interaction is not due to the magnetic field itself but, rather, to the interaction between electrons in the substrate and in the molecules via the electronic spin exchange interaction.

The mechanism at the base of this effect lies in the intrinsic property of chiral molecules to become transiently spin-polarized upon charge polarization. Namely, even if all the electrons in the molecules are paired and the total spin is zero, upon charge polarization and the formation of induced dipole, the two electric poles are also spin polarized, so that one pole has a charge with spin polarized opposite to that on the other pole. Which spin polarization is associated with which pole is defined by the handedness of the chiral molecule [13]. This Spin Dependent Charge Reorganization (SDCR) effect is related to the Chiral-Induced Spin Selectivity (CISS) phenomenon. As a result of the SDCR effect, the (partially) unpaired electron that is on the electric pole near the surface interact by the spin dependent exchange interaction with the magnetized surface. The magnitude of this interaction depends on the relative orientations of the spin on the molecule and the spin in the ferromagnetic substrate [14]. In a way, the presence of a magnetized surface plays the same role of a crystal seed of one enantiomer, driving the separation process known as kinetic entrainment, where the crystallization of the selected enantiomer is kinetically favored to allow for the separation of enantiopure products. The same magnetic surface can be used to separate many different chiral materials. The ability to use the SDCR for separation of enantiomers by crystallization with no need for seeding, was demonstrated qualitatively using ferromagnetic substrate positioned horizontally in a solution containing the racemic mixture [12].

Commonly, enantio-separation by crystallization occurs in static containers and the crystals are taken out after the crystallization process ends. In addition, the crystals are usually collected from the bottom of the device. Therefore, there is a need in the art in providing a technique for continuous crystallization. In addition, when one aims at forming crystals on the magnetic surface, one has to eliminate the collection of crystals that were formed in the bulk solution and not on the surfaces. According to a broad aspect of the present invention, there is provided a system for flow crystallization comprising a container having a bottom surface defining a first plane, the container including at least two planar magnetic surfaces being arranged in a spaced-apart manner along a first plane and being substantially parallel to a second plane; a magnetization vector of each of the magnetic surfaces being perpendicularly to the surface, wherein the container is configured such that the first plane is substantially perpendicular to the second plane; wherein a cavity formed in between the planar magnetic surfaces is configured to accommodate a racemic mixture including different enantiomers such that each magnetic surface interacts differently with each of the different enantiomers to thereby enable enantio-selective crystallization. Therefore, the system of the present invention is based on enantio-separation of the crystals using magnetic surfaces. The system is configured for performing the separation while the racemic mixture flows between the two magnetic surfaces. The enantio-separation of several compound shows quantitative result and allows to obtain highly pure material in a single separation stage. The present invention may provide a simultaneous high purity enantiomeric resolution of conglomerates using magnetic substrate. The magnetic surfaces are placed perpendicular (vertical) to the bottom of the container such that crystallization occurs on the magnetic surface and collection of the crystals is carried out by taking out the magnetic surfaces from the container. By applying magnetic substrates, magnetized perpendicular to the surface, pure conglomerates of several molecules were crystalized from racemic solution. The resolution is based on the Spin Dependent Charge Reorganization (SDCR) effect.

In some embodiments, by having two planar magnetic surfaces with opposite magnetization one with respect to the other, it was possible to simultaneously crystalize on each surface a different enantiomer. In this connection, it should be noted that because crystallization of both enantiomers happens simultaneously on the two opposite-magnetized surfaces, the ratio between the concentration of the two enantiomer is constant during the crystallization process and therefore the separation process is performed with high efficiency, in a single stage and with no need to refresh the solution. Moreover, the technique of the present invention does not require any seeding or chemical modification and is generally employable to any conglomerate. The system can operate continuously, as a flow system, and not in a static mode.

The vertical configuration eliminates contamination of the crystals by crystals formed in the bulk and may contain the opposite enantiomer. The flow system ensures a continuous process that can easily be interfaced with other chemical processes. Many systems can operate in series.

In some embodiments, one magnetic surface is magnetized such that the north pole of the magnetic surface has a magnetization vector pointing towards the cavity, and the other magnetic surface is magnetized such that the south pole of the magnetic surface has a magnetization vector pointing towards the cavity.

In some embodiments, the cavity defines a path through which the racemic mixture passes. The path may be configured and operable to allow selected enantiomers of the racemic mixture to crystalize separately on each magnetic surface.

In some embodiments, the system comprises an inlet for inputting and outputting the racemic mixture; the inlet and outlet being placed in planes perpendicular to the plane defined by the magnetic surfaces.

In some embodiments, the system comprises a pump being configured and operable to control a flow of the racemic mixture.

In some embodiments, the system comprises at least one temperature controller being configured and operable to control at least one of temperature of the racemic mixture or temperature of the planar magnetic surfaces.

In some embodiments, the cavity comprises a separating structure being configured to separate the cavity into two sub-channels, wherein the separating structure has a surface being configured to attract an enantiomer and enable crystallization on the surface.

In some embodiments, the magnetic surfaces comprise ferromagnetic or paramagnetic substrates being magnetized. The magnetic surfaces may be structured to increase roughness and thereby increase crystallization.

According to another broad aspect of the present invention, there is provided a method for flow crystallization. The method comprises providing a racemic mixture including different enantiomers, providing a path being formed by at least two substantially parallel planar magnetic surfaces interacting between the racemic mixture and the path, thereby enabling crystallization of each enantiomer on a different magnetic surface.

In some embodiments, interacting between the racemic mixture and the path comprises controlling a flow of the racemic mixture.

In some embodiments, interacting between the racemic mixture and the path comprises controlling a temperature of the racemic mixture and/or of the planar magnetic surfaces. The flowing of the mixture through the channel may be performed continuously.

In some embodiments, the method further comprises dissolving crystals on the planar magnetic surfaces.

In some embodiments, dissolving crystals on the planar magnetic surfaces comprises flowing a solvent therein to enable interaction with one of the planar magnetic surfaces; changing the orientation of the path and flowing the solvent therein to enable interaction with the other planar magnetic surface.

In some embodiments, dissolving crystals on the planar magnetic surfaces comprises providing a separating structure being configured to separate the path into two sub-channels and dissolving crystals on the separating structure.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 2 is a general flow chart illustrating, in a non-limiting manner, a possible method for eye tracking;

DETAILED DESCRIPTION OF EMBODIMENTS

Figure 1A:
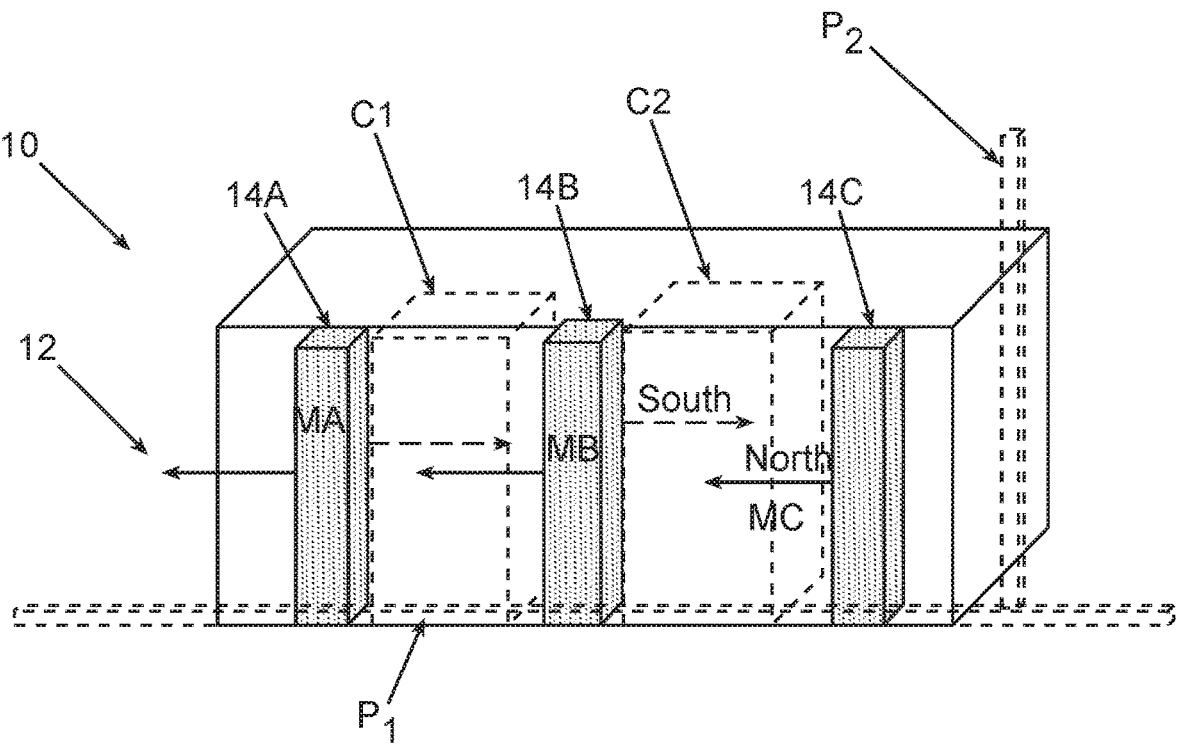
FIG. 1A is a schematic block diagram illustrating, in a non-limiting manner, the system for flow crystallization.

Reference is made to FIG. 1A showing a block diagram representing a system 10 for flow crystallization. System 10 comprises a container 12 having a bottom surface defining a first plane $P_1$ and side surfaces defining a second plane P2 such that the first plane $P_1$ is substantially perpendicularly to the second plane $P_2$. Container 12 includes at least two planar magnetic surfaces 14A, 14B and 14C being arranged in a spaced-apart manner along a first plane $P_1$ and being substantially parallel to the second plane $P_2$. Each magnetic surfaces 14A, 14B and 14C has a magnetization vector MA, MB and MC being perpendicularly to the surface. The cavity C1 and/or C2 formed in between the planar magnetic surfaces is/are configured to accommodate a racemic mixture including different enantiomers such that each magnetic surface 14A, 14B and 14C interacts differently with each of the different enantiomers to thereby enable enantio-selective crystallization.

In some embodiments, magnetic surfaces 14A and 14B may have opposite magnetization one with respect to the other has represented by the direction of vector MA in cavity C1. For example, the planar magnetic surfaces may have opposite magnetization, perpendicular one with respect to the other. In a specific and non-limiting example, one magnet can be magnetized so that the magnetic moment is pointing out of the surface while the other is magnetized with its magnetic moment pointing towards the surface. While the racemic solution is flowing through the path, the molecules are crystalized on the magnetic surfaces, so that mainly one enantiomer is crystalized on one side and the other is crystalized on the other side. The magnetic surfaces may be formed by magnetic substrates, ferromagnetic or paramagnetic substrates being magnetized. Moreover, the magnetic surface may be structured to increase roughness and thereby increase crystallization.

In a specific and non-limiting example, magnetic surface 14C is magnetized such that the north pole of the magnetic surface has a magnetization vector MC pointing towards the cavity C2, and magnetic surface 14B is magnetized such that the south pole of the magnetic surface has a magnetization vector MB pointing towards the cavity C2.

Figure 1B:
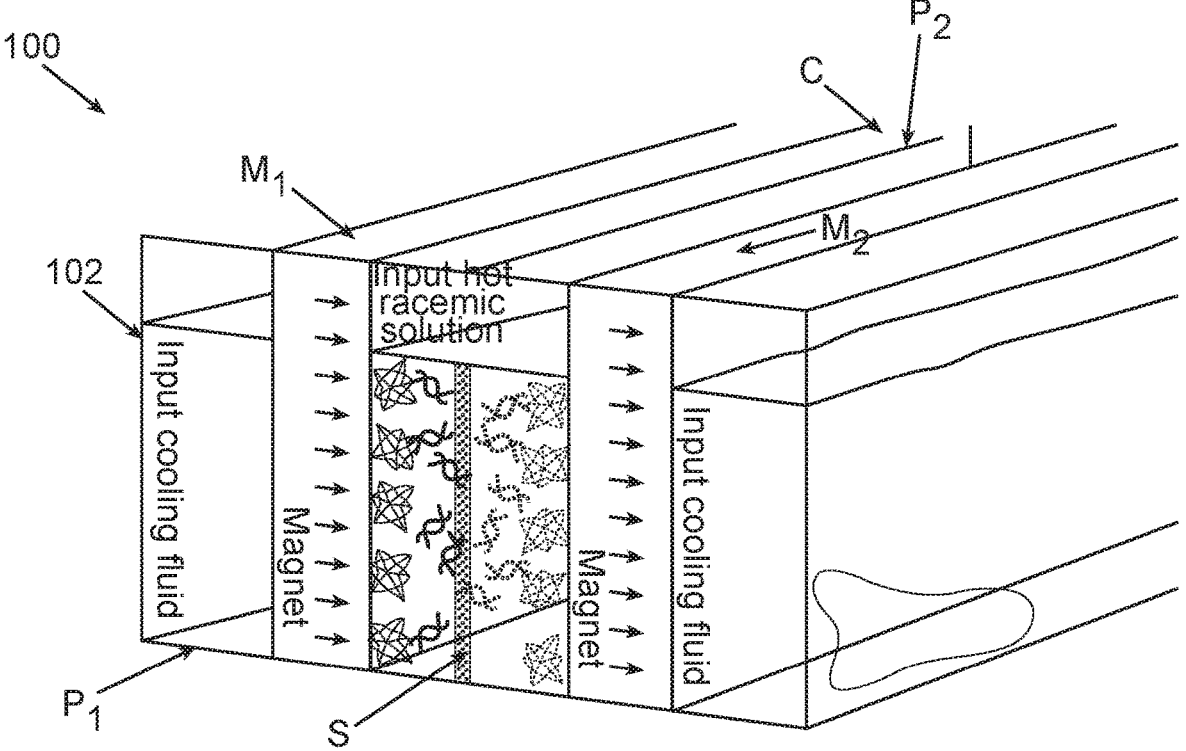
FIG. 1B is a possible schematic representation of the continuous flow crystallization system of the present invention.

Reference is made to FIG. 1B showing a specific and non-limiting system 100 for flow crystallization. System 100 comprises a container 102 having a bottom surface defining a first plane $P_1$. Container 102 accommodates two substantially parallel planar magnetic surfaces $M_1$ and $M_2$ being arranged in a spaced-apart manner along a second plane $P_2$. Container 102 is configured such that the first plane $P_1$ is substantially perpendicularly to the second plane $P_2$. A cavity C formed in between planar magnetic surfaces $M_1$ and $M_2$ is configured to accommodate a racemic mixture (e.g. input hot racemic solution) including different enantiomers such that each magnetic surface interacts differently with each of the different enantiomer (e.g. each magnetic surface attracts a different enantiomer) to thereby enable enantio-selective crystallization. Therefore, cavity C defines a path through which the racemic mixture passes. The path is configured and operable to allow selected enantiomers of the racemic mixture to crystalize separately on each magnetic surface. The path may thus be a flowing channel being formed by the planar magnetic surfaces $M_1$ and $M_2$ being spaced apart by a certain distance. Planar magnetic surfaces $M_1$ and $M_2$ may be configured to be detachable from container 102 such that the crystals can be removed from system 100 either by taking the magnetic surface(s) $M_1$ and/or $M_2$ out of container 102 and dissolving the crystals on their surface, or by tilting the system 100 (e.g. by 90 degrees) and flowing a certain amount of solvent into cavity C such that the solvent is in contact with only the bottom surface of container 102 after tilting one of the magnetic surfaces. After the crystals on the bottom surface dissolve, system 100 can be tilted in the opposite direction, so that the other magnetic surface is then placed on the bottom of container 102 and the crystals formed on this surface are dissolved.

In some embodiments, the cavity C may comprise a separating detachable structure S (e.g. a wall) being configured to separate the cavity into two sub-channels. Separating structure S has a surface being configured to attract an enantiomer and enable crystallization on the surface. The racemic solution can thus flow between one magnetic surface and the separating structure S. After formation of the crystals, separating structure S may be taken out of container 102 and the crystals may be then dissolved on the surface separating structure S.

Figure 1C:
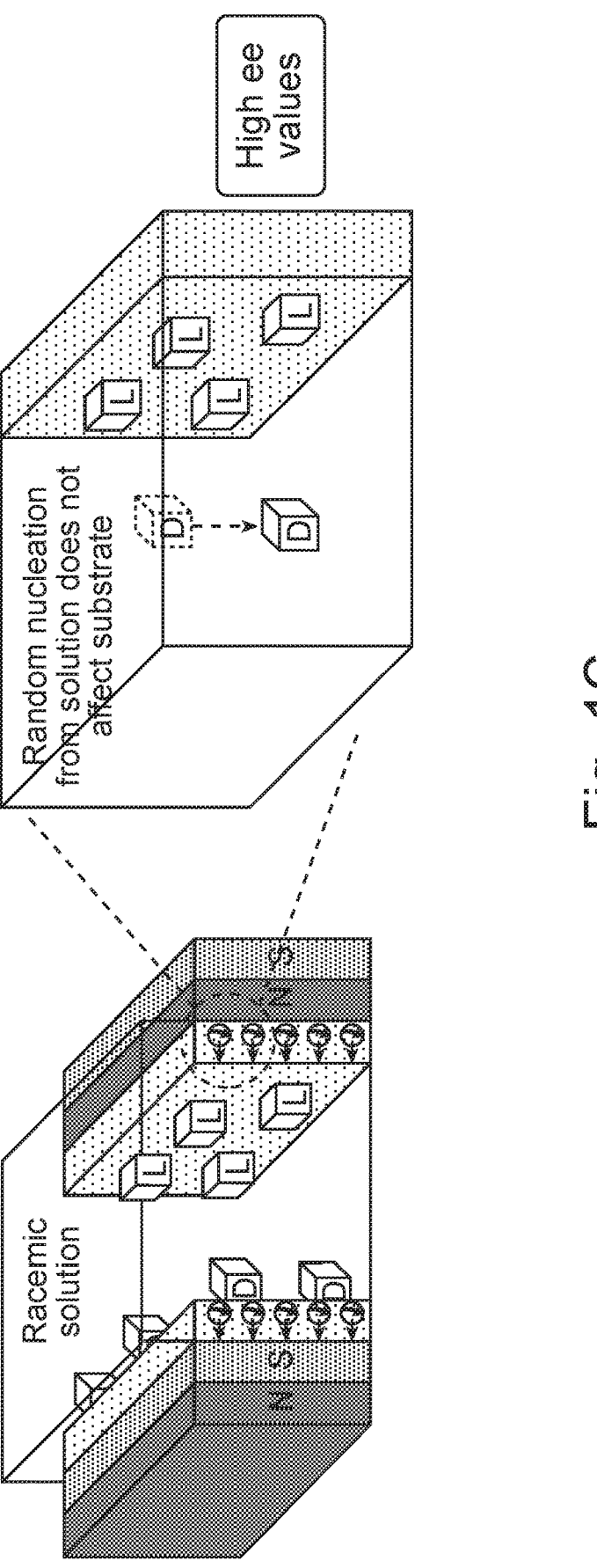
FIG. 1C is a schematic representation of a possible system used in the crystallization experiments, having ferromagnetic substrates in a vertical configuration.

Reference is made to FIG. 1C showing a possible schematic system used for the crystallization experiments having ferromagnetic substrates in a vertical configuration. The north-pole is defined as the pole at which the magnetic field lines are going into the surface of the magnet. In this specific and non-limiting example, ferromagnetic nickel substrates were prepared by evaporating a 10 nm titanium layer on Si(100) wafers, followed by a 20 nm layer of nickel and finally a 7 nm layer of gold. The thin gold capping layer is reducing the oxidation of the ferromagnetic layer in air and in solution, so that it preserves the magnetic and spin transport properties for long operating conditions. The crystallization process was carried on in plastic cuvettes of 5×10×30 mm, having a total volume of 1.5 mL. Two permanent neodymium magnets (having each a 0.45 T field strength) were placed against the two opposite long walls of the container, oriented such as the magnetic interaction between the two is attractive. During crystallization, two ferromagnetic substrates were held vertically against the same walls of the cuvette, so that both substrates remain parallel to each other. This gives rise to opposite spin polarizations of the two ferromagnetic (FM) substrates, according to the direction of the magnetic field. The distance between the two substrates in the setup was 4 mm.

Figure 1D:
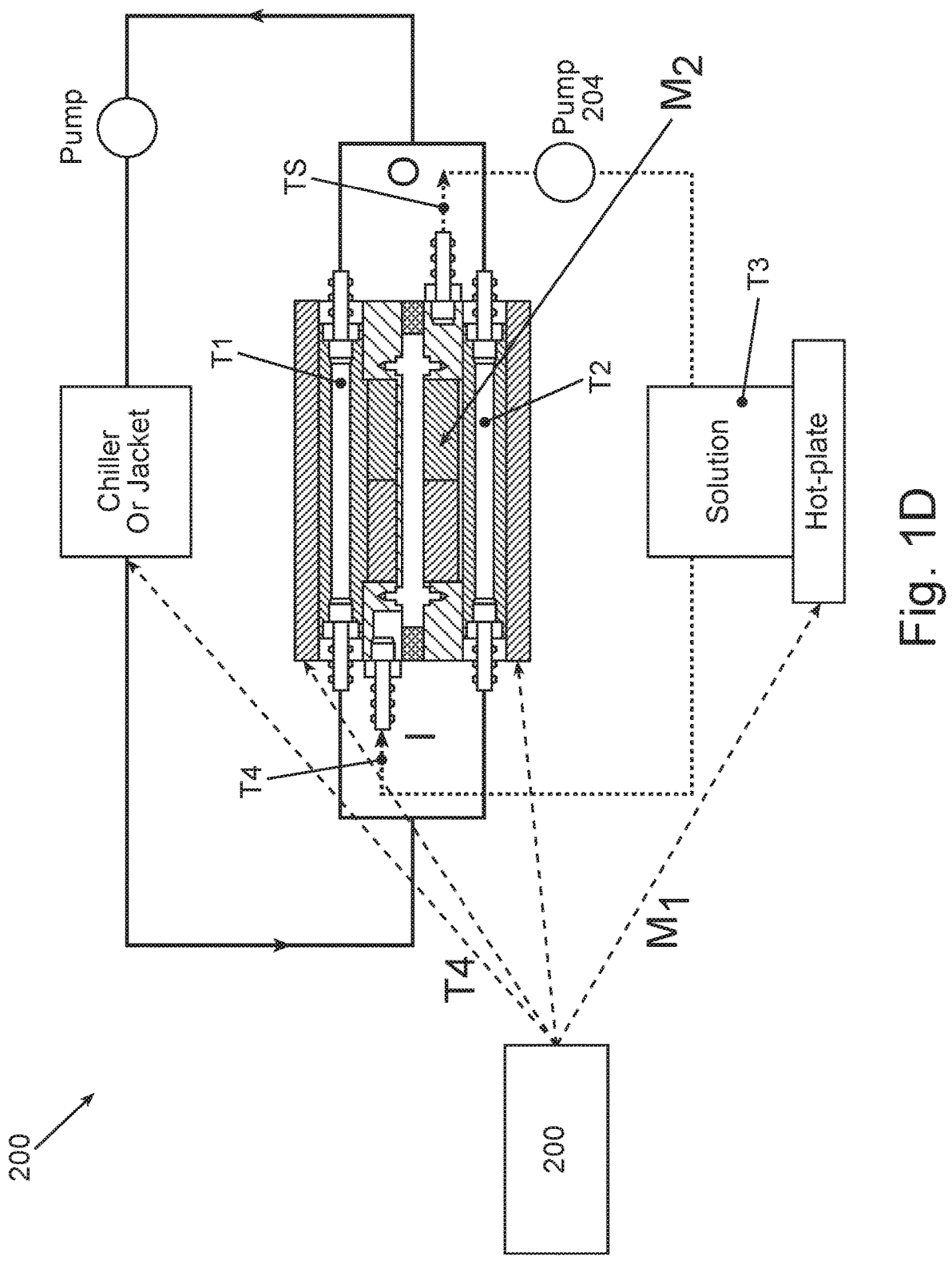
FIG. 1D is a specific and non-limiting example of the continuous flow crystallization system of the present invention.

Reference is made to FIG. 1D showing a system 200 according to some embodiments of the present invention for controlling at least one of a flow of the racemic mixture and a temperature of the racemic mixture and/or of the planar magnetic surfaces. System 200 comprises one or more temperature controllers 202 being configured and operable to control at least one of temperature of the racemic mixture, or temperature of the planar magnetic surfaces. In this specific and non-limiting example, the temperature of the magnetic surfaces $M_1$ and $M_2$ can be controlled separately from the temperature of the racemic solution. In this specific and non-limiting example, the temperature controller 202 comprises a heating element (e.g. a hot plate) being configured for heating the racemic solution at a temperature T3 and a cooling element (e.g. a chiller or jacket) being configured for cooling each of the planar magnetic surfaces at temperatures T1 and T2 respectively. The racemic solution penetrates the container at a certain temperature T4 and after interaction of the magnetic surfaces, the racemic solution is outputted at a lower temperature T5. However, the temperature control may be implemented by using the same temperature controller or different elements as illustrated in this example. System 200 may comprise a pump 204 being configured and operable to control a flow of the racemic mixture. The pump enables to control the flowing of the mixture through the channel and to perform continuous circulation of the mixture. The cooling element 202 may also comprise a pump as illustrated in the figure being configured for circulating a cooling fluid along the magnetic surfaces. The figure also illustrates the inlet and the outlet of the cooling fluid, cooling both magnetic surfaces $M_1$ and $M_2$. System 200 also comprises an inlet I and outlet O configured for inputting and outputting the racemic solution respectively. In this specific and non-limiting example, racemic solution inlet and outlet are placed in planes perpendicular to the plane defined by magnetic surfaces $M_1$ and $M_2$.

Asparagine is an α-amino acid that is crucial in the biosynthesis of glycoproteins and many other proteins. In recent studies, the separation of D/L-asparagine was examined by using vertical placed ferromagnetic (FM) substrates. The inventors prepared a system according to the teachings of the present invention. To implement vertical placed magnetic substrates, two FM layers were prepared by evaporation of 10 nm gold on a 120 nm Ni-coated silicon wafer. A thin layer of gold (10 nm) was deposited on the FM layer, which does not diminish the magnetic or spin transport properties but protects the FM layer from oxidation. The experiments were performed by magnetizing each FM layer such that the magnetic field has a pointing direction pointing to the north pole or the south pole, respectively. A container was formed by placing the two FM layers in a reservoir at a certain distance forming a cavity. A racemic supersaturated solution of asparagine was introduced in the cavity to induce the crystallization process.

Reference is made to FIG. 2 showing a flow chart representing a method 300 for flow crystallization. Method 300 comprises providing in 302 a racemic mixture including different enantiomers, providing in 304 a path being formed by at least two substantially parallel planar magnetic surfaces, interacting in 306 between the racemic mixture and the path, enabling in 308 crystallization of each enantiomer on a different magnetic surface. Interacting between the racemic mixture and the path may comprise in 310 controlling a flow of the racemic mixture and/or controlling a temperature of the racemic mixture and/or of the planar magnetic surfaces. For example, controlling a flow of the racemic mixture may comprise performing the flowing of the mixture through the path continuously.

In some embodiments, the method further comprises dissolving in 312 crystals on the planar magnetic surfaces. Dissolving crystals on the planar magnetic surfaces may comprise flowing a solvent therein to enable interaction with one of the planar magnetic surfaces; changing the orientation of the path and flowing the solvent therein to enable interaction with the other planar magnetic surface. Dissolving crystals on the planar magnetic surfaces may comprise providing a separating structure being configured to separate the path into two sub-channels and dissolving crystals on the separating structure.

Figures 3A, 3B:
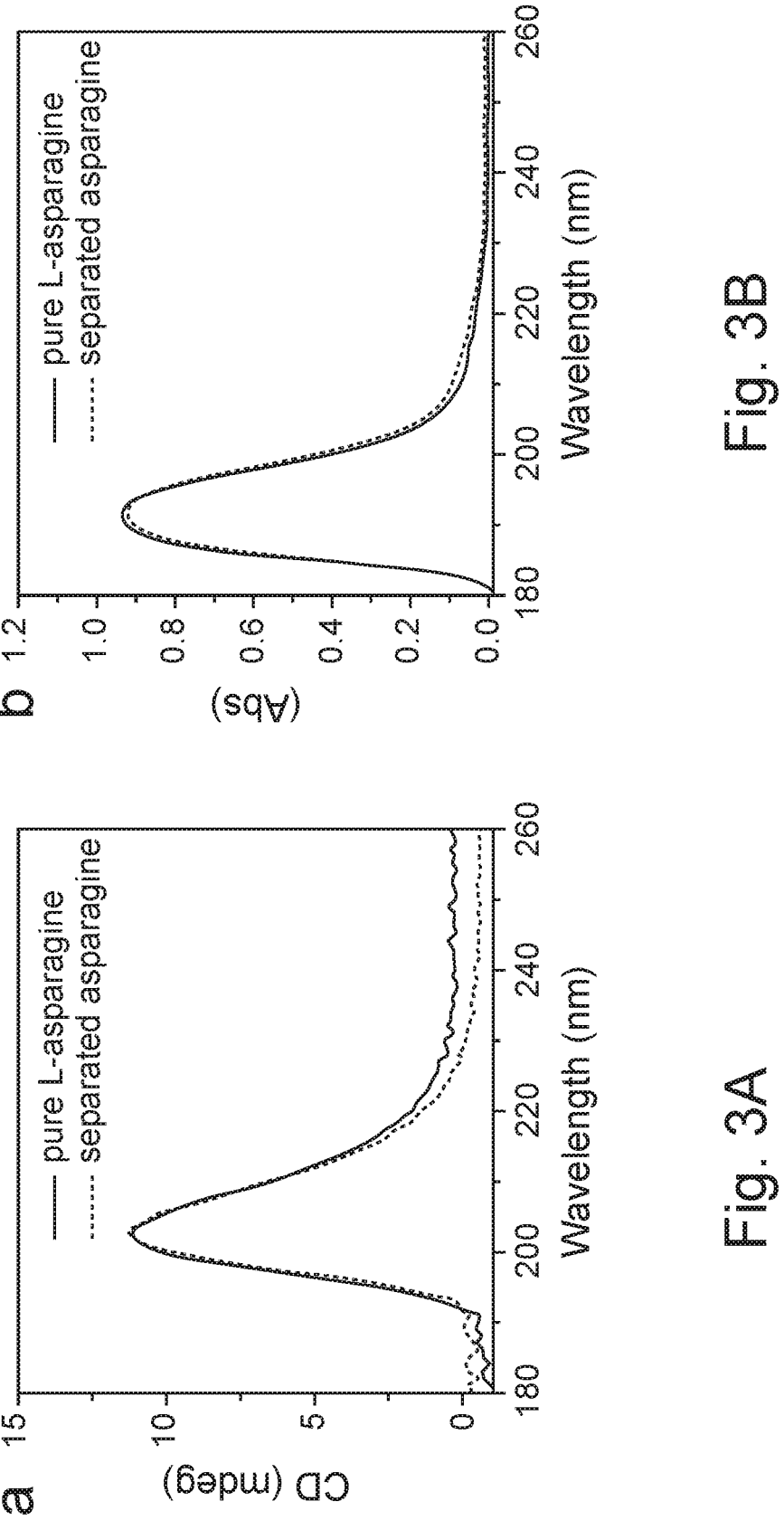
FIGS. 3A-3B show Circular Dichroism (CD) and Ultra-violet-Visible (UV-vis) absorbance spectra of pure L-asparagine and separated asparagine respectively.

Reference is made to FIGS. 3A-3B showing a comparison results between CD and UV-vis absorbance spectra of pure L-asparagine and separated asparagine by using the system of the present invention. Clearly, when the absorbance of them is the same, their CD spectra were almost overlapped, suggesting that high purity chiral crystals were obtained. Chiral high-performance liquid chromatography (HPLC) can also be used to detect the precise enantiomeric excess (EE).

Table 1 below shows enantiomeric excess (EE in percentage) of asparagine crystals separated with magnets pointing south or north. As shown, an opposite EE value was obtained when the magnets were pointing north. These data demonstrate significant enantio-selectivity crystallization based on the magnetic substrates.

TABLE 1

| Magnet Pointing | Enantiomeric excess (ee, %) |
|---|---|
| South | +100 |
| South | +100 |
| South | +33 |
| South | +100 |
| South | +94 |
| South | +100 |
| South | +100 |

TABLE 1-continued

| Magnet Pointing | Enantiomeric excess (ee, %) |
|---|---|
| North | −75 |
| North | −100 |

Figures 4A, 4B:
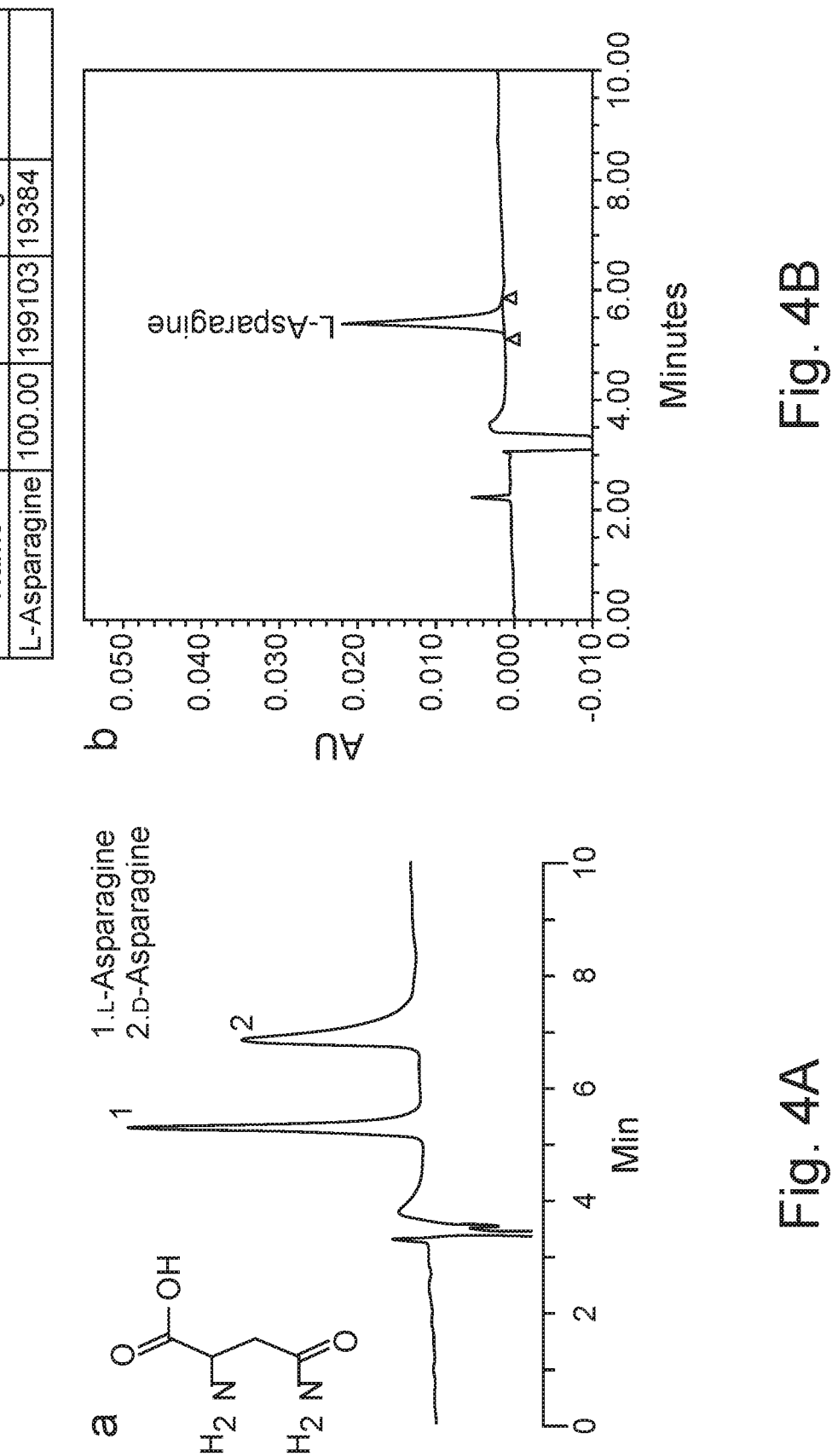
FIGS. 4A-4B show chiral high-performance liquid chromatography (HPLC) traces of asparagine enantiomers and crystals separated by magnetic substrates respectively.

FIGS. 4A-4B show chromatograms resulting from the chiral HPLC. More specifically, FIG. 4A shows the chromatogram of the racemic mixture before the separation process, while in FIG. 4B chromatogram is shown after separation. As shown in FIGS. 4B, only one peak, which belongs to L-asparagine, was observed from the separated crystals. Therefore, the enantiomeric excess EE value is 100% when magnets are magnetized, so that the north pole is at the surface.

The experiments described below are non-limiting and provide ferromagnetic surfaces induced crystallization of conglomerates. Although the results obtained in low scale, upscaling does not require any technological transformation. The method of the present invention is general, no seeding is required and both pure enantiomers can be obtained simultaneously in a single stage.

Figures 5A, 5B, 5C:
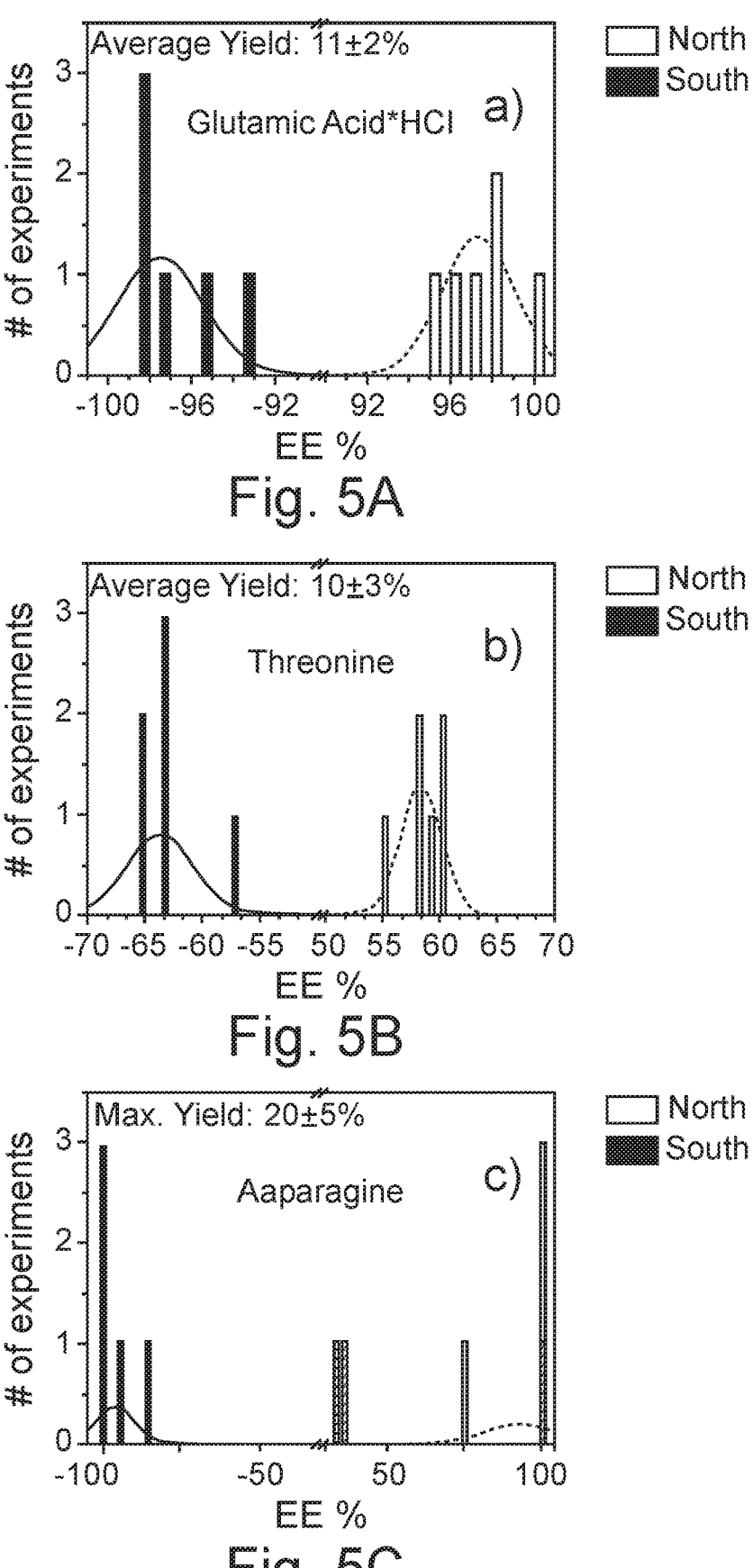
FIGS. 5A-5C are graphical representation of statistics of crystallization experiments for glutamic acid*HCl (FIG. 5A), threonine (FIG. 5B) asparagine (FIG. 5C)

FIGS. 5A-5C present crystallization results for three different amino acids: glutamic acid, threonine and asparagine. The enantiomeric excess of crystallization reaches numbers that are close to 100%, with crystallization yields between 10-20%. More specifically, the glutamic acid crystallization was carried out from a supersaturated racemic solution of the amino acid in 5 M HCl (102 mg/mL Glu), gradually cooled from 80° C. to 33° C. over a time period of 2 hours, and then left for 36 hours at constant temperature. The crystals grown on the ferromagnetic substrates were collected and characterized (FIG. 5A), while the ones that were formed in solution and precipitated on the bottom of the container were not considered. The CD spectra of the collected crystals, shown in FIG. 5D, were measured by dissolving all the crystals collected from each ferromagnetic surface in water. The CD spectra show that an enantiospecific crystallization takes place on the surface of the ferromagnetic substrates, and that the enantiospecificity depends on the magnetic field applied on the substrate. The substrates polarized by the north-pole magnet show a preferential growth of L-isomer crystals, whereas the south-pole polarized surfaces show the growth of the D-isomer.

Figures 5D, 5E:
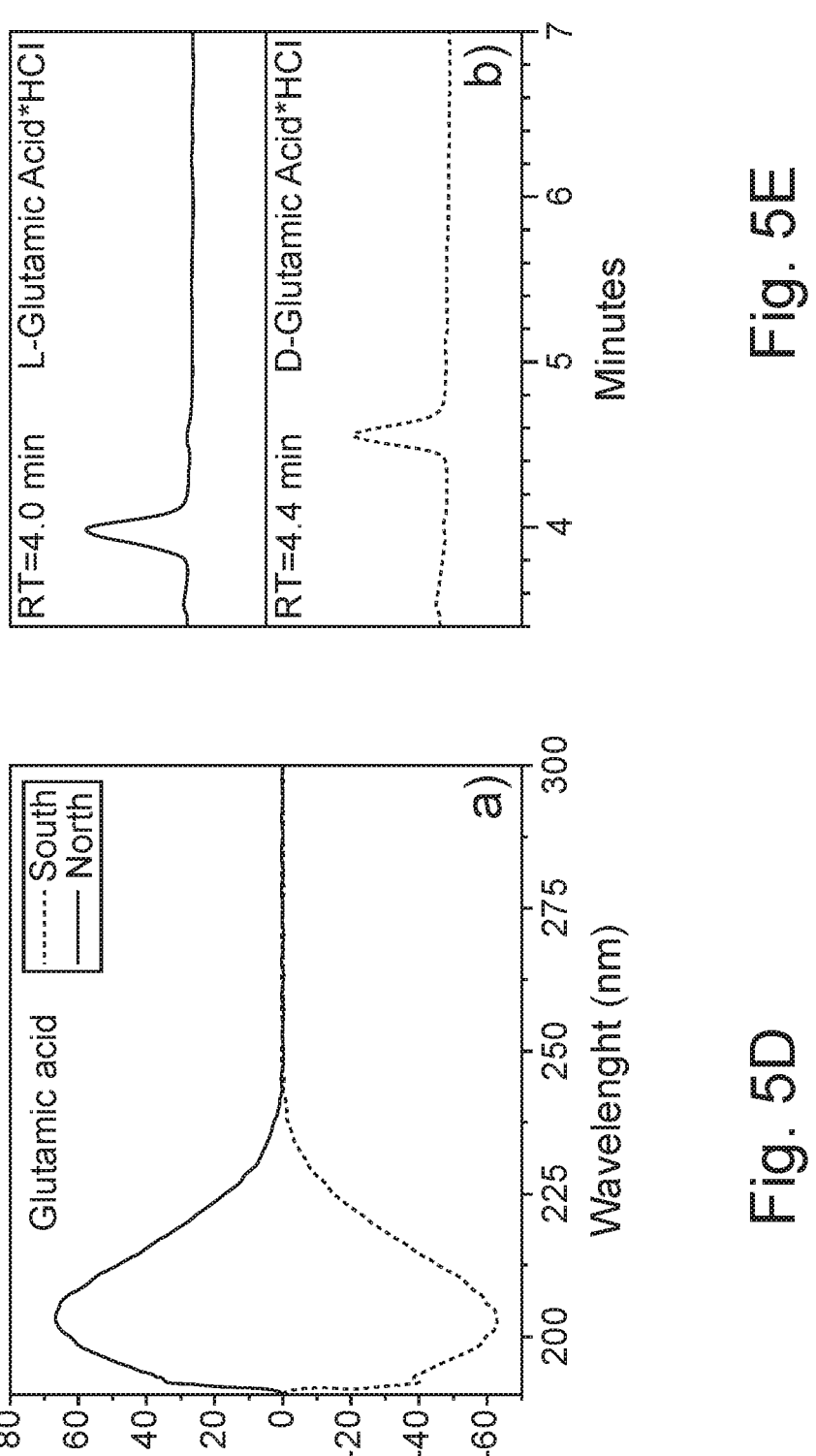
FIG. 5D shows CD spectra of two crystals of glutamic acid*HCl, grew on ferromagnetic surfaces magnetized respectively with a north and south magnet pole close to the back of the surface.
FIG. 5E shows HPLC chromatograms of crystals collected from the magnetized surfaces polarized by the north-pole and south-pole magnets respectively.

Enantiomeric excess (EE) of the crystals has been determined using CD spectroscopy, comparing the CD signal with respect to a calibration curve obtained from the pure isomer and with chiral HPLC (FIG. 5E). The EE of the L-enantiomer obtained by this process is 97±2% and 97±2% for the D-enantiomer. The results show that it is possible to separate simultaneously enantiomers with very high purity from the racemic mixture. FIG. 5A above shows the data for each repetition of the experiment, with the EE % of crystals collected from the surfaces of FM-substrates. The average yield obtained by applying this method is around 11±2% (calculated from the amount of starting material) for a single step of crystallization.

Figure 5F:
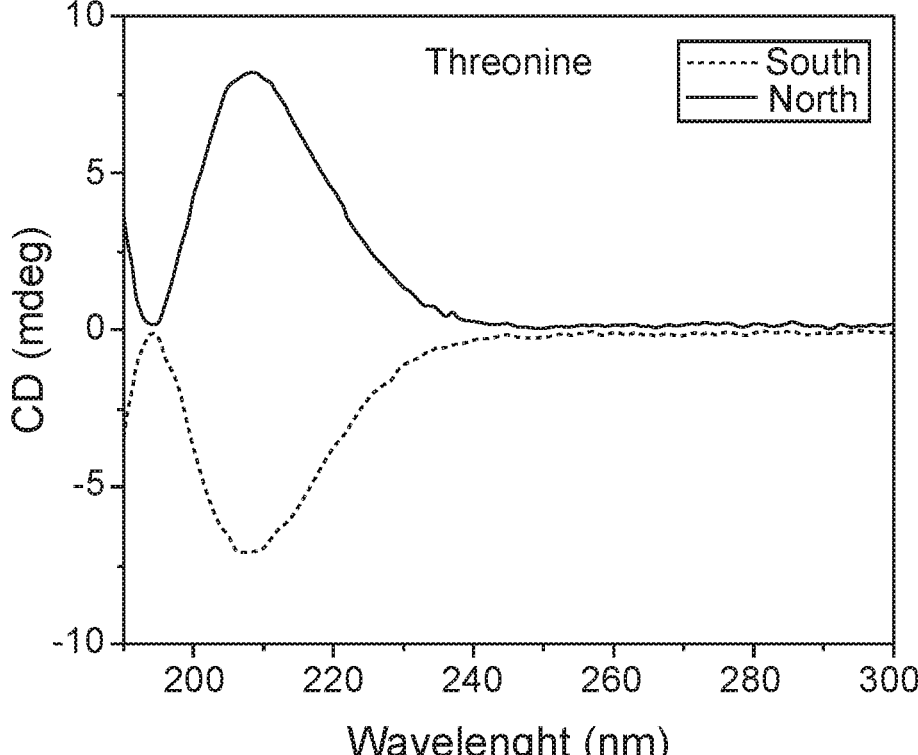
FIG. 5F shows CD spectra of two crystals of threonine, grew on ferromagnetic surfaces magnetized respectively with a north and south magnet pole close to the back of the surface.

Threonine crystallization was carried out starting from a supersaturated racemic mixture in 2M HCl solution (600 mg/mL Thr), with gradual cooling from 80° C. to 28° C., over a time period of 1.5 h and then left for 36 hours at constant temperature. The CD spectra illustrated in FIG. 5F of the crystals collected from the surfaces shows that crystals grown at the north-pole polarized substrates have an enantiomeric excess of L-threonine, while crystals grown at the south-pole polarized substrates have D-threonine excess.

The purity of the crystals obtained by applying this method was around 64±3% EE for D-threonine and 58±2% for L-threonine, as shown in FIG. 5B, determined by CD spectroscopy only. The average yield obtained by applying this method to threonine is around 10±3% (calculated from the amount of starting material) for a single step of crystallization.

Figures 5G, 5H:
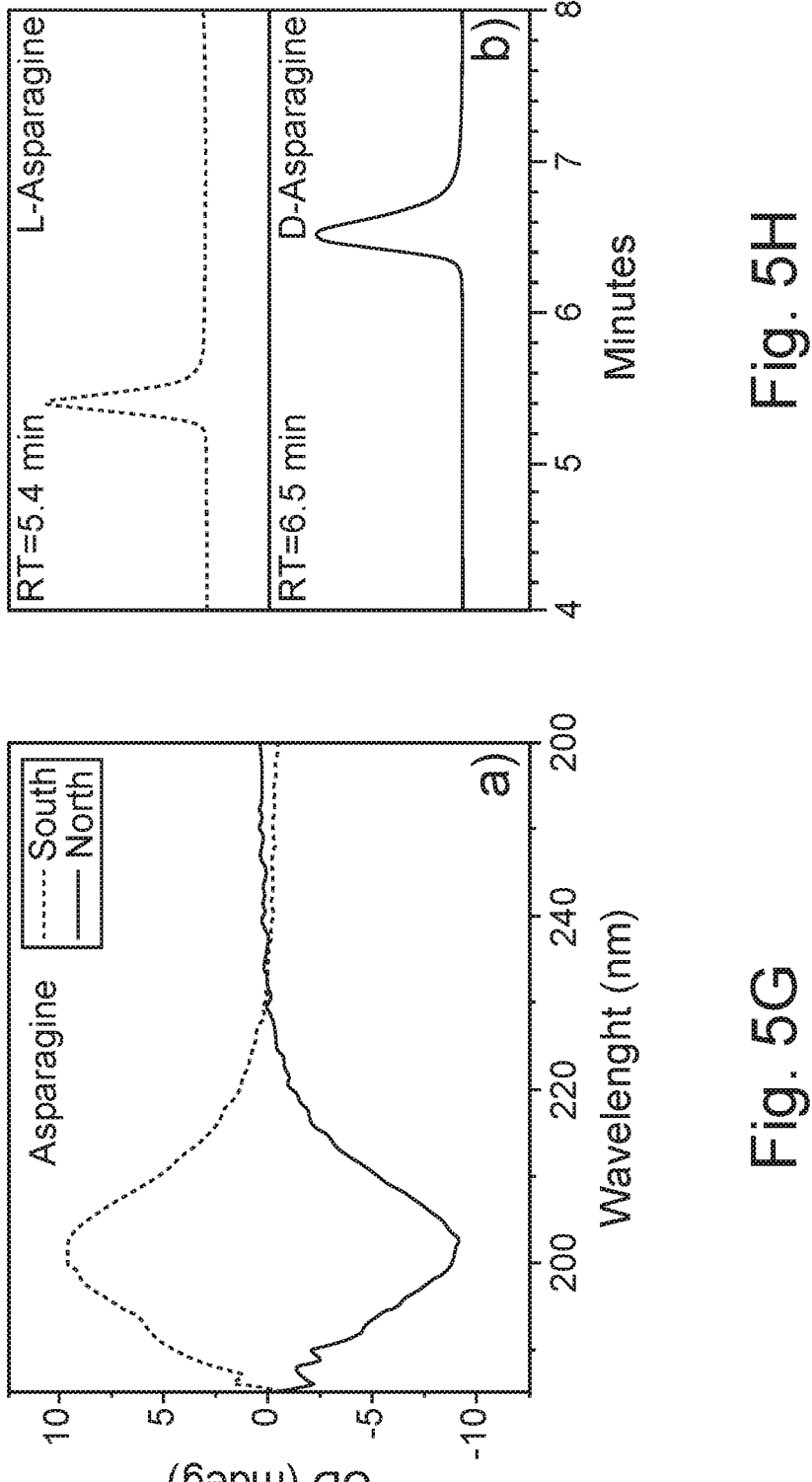
FIG. 5G shows CD spectra of two crystals of asparagine, grew on ferromagnetic surfaces magnetized respectively with a north and south magnet pole close to the back of the surface.
FIG. 5H shows HPLC chromatograms of crystals collected from the magnetized surfaces polarized by the south-pole and north-pole magnets respectively.

Asparagine crystallization was carried out from a supersaturated racemic solution of the amino acid in water (190 mg/mL Asn), heated at 95° C. and let to cool down to room temperature, and then left to crystallize for 12 h. The enantiopurity of the crystals collected from the surfaces was measured with CD spectroscopy (FIG. 5G) and chiral HPLC (same analytic method used for the glutamic acid, FIG. 5H). The crystals grown on the north-pole polarized substrates were D-asparagine, while the crystals grown on the south-pole polarized substrates were L-asparagine (FIG. 5C). The enantiopurity of the crystals was around 94±12% for D-asparagine crystals and 96±6% for L-asparagine crystals. The maximum yield of the crystallization was 20±5%.

Figures 5I, 5J:
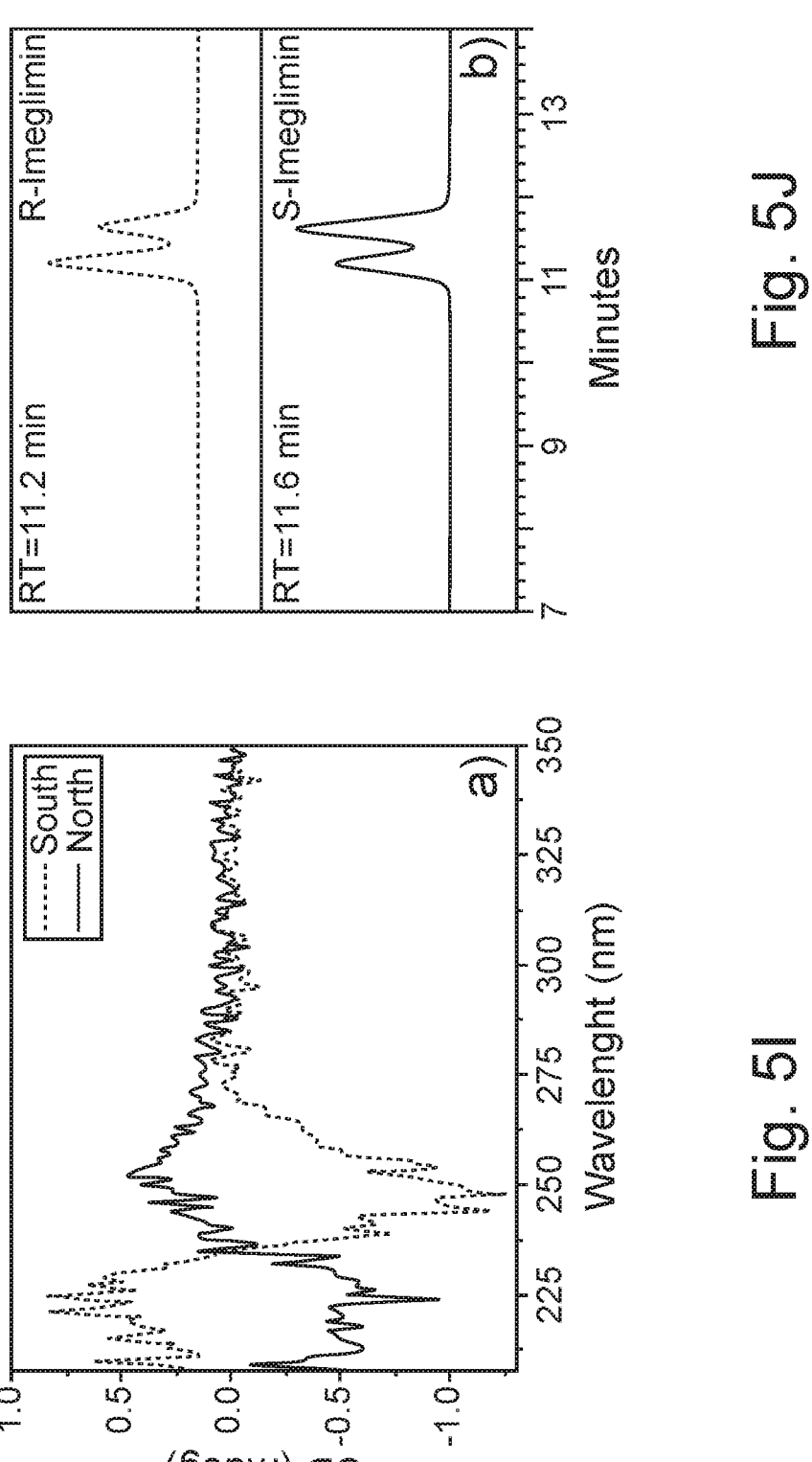
FIG. 5I shows CD spectra of two crystals of imeglimin*HCl, grew on ferromagnetic surfaces magnetized respectively with a north and south magnet pole close to the back of the surface.
FIG. 5J shows HPLC chromatograms of crystals collected from the magnetized surfaces polarized by the south-pole and north-pole magnets respectively.

The resolution of the racemic imeglimin hydrochloride salt was carried out by crystallization on magnetic substrates from methanol (325 mg/mL Imeglimin). The solution was gradually cooled from 30° C. to 6° C., over a time period of 2 hours and left to crystallize for 20 hours at this temperature. CD spectroscopy of the collected crystals confirms opposite enantiomeric excess at the opposite magnetized substrates (FIG. 5I). Chiral HPLC measurements showed EE up to 22% for the R-isomer at the south-pole polarized substrate and up to 27% EE for the S-isomer at the north-pole polarized one (FIG. 5J).

Figure 6:
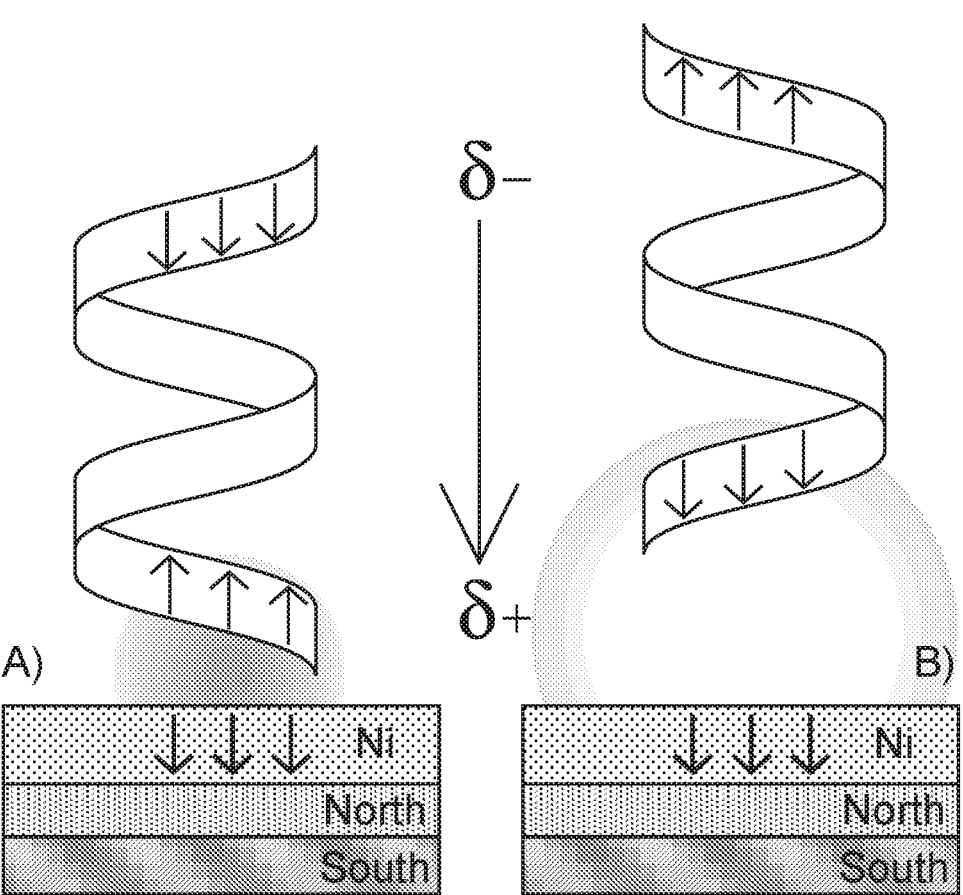
FIG. 6 schematically illustrate the enantioselective mechanism.

The crystallization experiments performed showed that a one-batch simultaneous resolution of a conglomerate couple is obtainable by utilizing magnetized surfaces as substrates for the crystallization. This phenomenon is general, and the same system was used for all the materials studied. FIG. 6 schematically illustrates the mechanism of the interaction of chiral molecules with the ferromagnetic substrate. Since the strength of the interaction depends on the molecular properties, the system should be tuned for efficient separations to be achieved. The change in interaction relates to the strength of the CISS effect for a specific molecule, and the electric dipole moment. Under a large enough external magnetic field, the electrons' spin states in the ferromagnetic material are split, with majority of spins pointing in one direction. When a chiral molecule approaches the ferromagnetic surface, charge is reorganized in the molecule to form an induced dipole, due to the dispersive forces. Because of the SDCR effect, this electron density reorganization is accompanied by spin-polarization due to the chirality of the molecule. Each pole of the induced electric dipole is associate with spin polarization, so that there is one orientation of spin polarization associate with the positive pole and the opposite orientation is associated with the negative pole. Which orientation is associated with which pole, depends on the handedness of the chiral molecule. The relative electronegativity of the molecule and the surface controls the attractive potential. One electric pole is attracted to the surface more than the other. Hence the spin-polarized pole interacts with the spin-polarized ferromagnetic substrate and the interaction is either more or less attractive depending if the spin on the pole and the spin in the surface are antiparallel (singlet-like state) or parallel (triple like state). Since the orientation of the spin on the electric pole of the molecule, depends on the specific enantiomer, clearly this interaction is enantiospecific and allows to separate the enantiomers by their adsorption rate on the surface. In a recent experiment, the interaction of two enantiomers with a ferromagnetic substrate was directly measured by AFM [15]. It was found that the difference in the interaction energy between the ferromagnetic substrate magnetized perpendicular to the surface and the two different enantiomers is of the order of 10 KJ/mole (0.1 eV). This allows the surface to impart an asymmetric bias on the formation of the first crystal seeds. This mechanism, in which the preferential crystallization stems from molecular interactions with the surface rather than the preferential adsorption of small chiral crystal seeds, is supported by experiments on the crystallization of sodium chlorate. Sodium chlorate is an achiral molecule that crystallizes in a chiral space group, and therefore for this system there is no possibility for spin-spin interaction when the molecule is completely solvated. Any preferential crystallization was not observed for this system in the experiments with ferromagnetic surfaces, and thus the asymmetric bias comes from the interaction of the dissolved chiral molecules with the ferromagnetic substrates, rather than the seeds formed in the initial phase of the crystallization process.

The most common procedure to enantioseparate a conglomerate couple is to use a kinetic resolution by seeding the racemic solution with small crystals of one of the two enantiomers, allowing the formation of one enantiopure crystal phase [10]. This procedure usually allows for a limited crystallization yield, usually below 10%, since at higher crystallization yields the solution becomes enriched with the opposite enantiomer that eventually starts to crystallize, lowering the enantiopurity of the obtained material. The method of the present invention does not have this limit, since the crystallization of both enantiomers occurs simultaneously, thus leaving the enantiomeric ratio in the solution unchanged for the whole crystallization. In the experiments on glutamic acid, for example, a maximum crystal yield of 14% was obtained in one step (7% of pure D-Glu and 7% of L-Glu, with an enantiopurity of >95%), which is nearly double to what is normally accessible with single batch crystallizations based on kinetic resolution. Increasing the surface area of the ferromagnetic substrates should increase the number of crystals formed on the surfaces and thus lead to improved yields.

Another appealing property of the presented method is that it does not require the seeding with enantiopure crystals since the preferential crystallization is directed by the ferromagnetic substrates.

Figure 7:
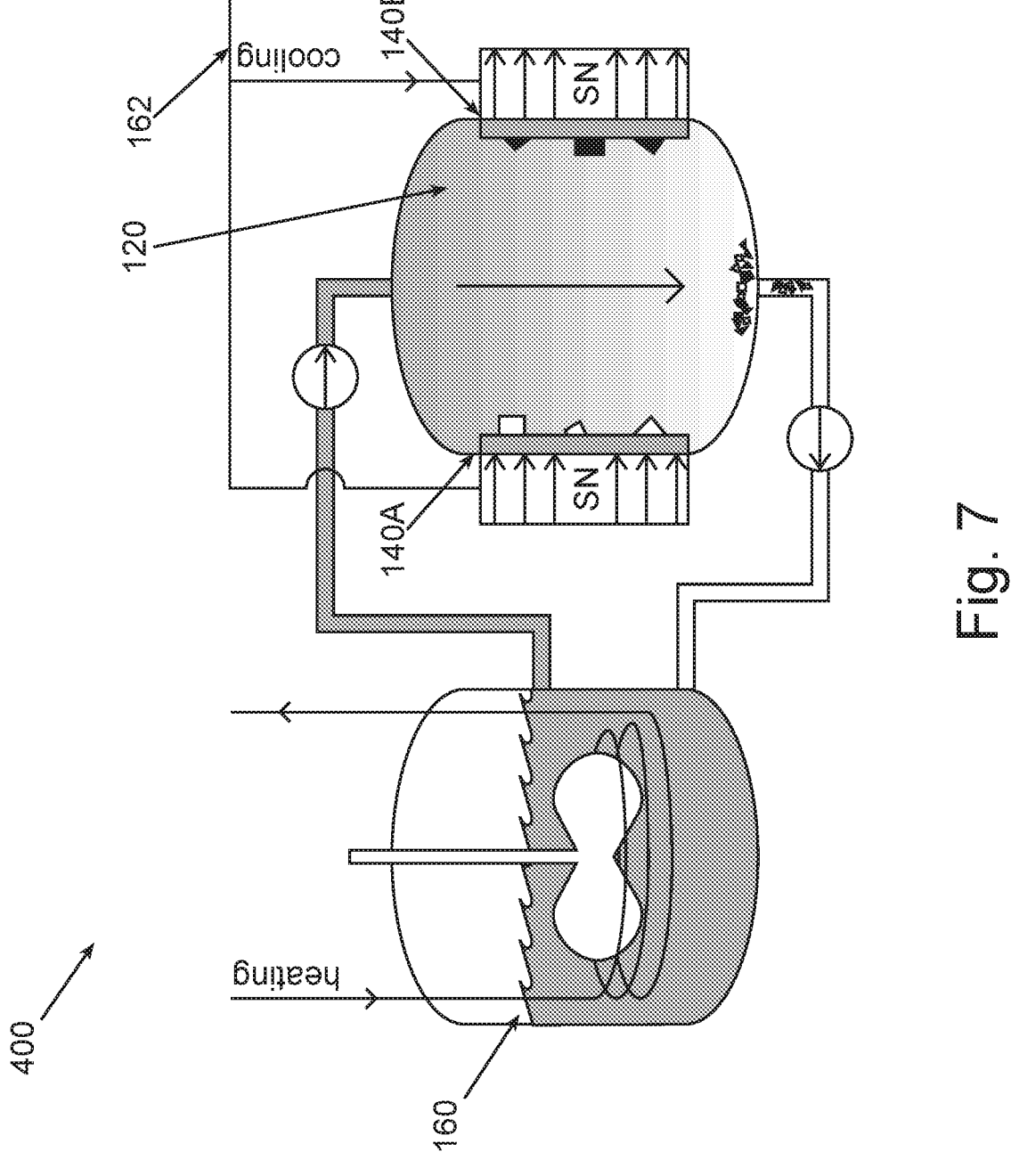
FIG. 7 schematically illustrate a possible configuration of a system being configured to improve the crystallization yield of the ferromagnetic substrates induced resolution, according to some embodiments of the present invention.

A possible strategy to improve the crystallization yield is to switch from a static crystallization setup to a continuous flow system and to recycle the crystals that are not attached to the ferromagnetic substrates. Reference is made now to FIG. 7, illustrating a system 400 being configured as a continuous recycling flow system. System 400 comprises inter alia a container 120 including two planar ferromagnetic surfaces 140A and 140B being arranged in a spaced-apart manner. The container 120 defines a cavity formed in between the planar ferromagnetic surfaces in which a racemic mixture including different enantiomers is accommodated. Each ferromagnetic surface 140A, 140B interacts differently with each of the different enantiomers to thereby enable enantio-selective crystallization. System 400 comprises a temperature controller 160 being configured to keep the mother racemic solution at a higher temperature than the substrates, to thereby promote the crystallization only on the ferromagnetic surfaces. System 400 also comprises a cooling element 162 being configured for cooling each of the planar ferromagnetic surfaces. As illustrated in FIG. 7, at the same time it is possible to remove the crystals from the bottom of system 400 not bound to the walls and feed them back to the container 120 to maximize the final crystallization yield. In this way, the crystals grow only on the ferromagnetic surfaces 140A and 140B with a very high EE %, and the final yield depends on the substrate area available for crystallization.

The invention claimed is:

1. A system for flow crystallization comprising:

a container having a bottom surface defining a first plane and at least one side surface defining a second plane substantially perpendicular to the first plane; and an arrangement of at least two planar magnetic surfaces in the container, said at least two planar magnetic surfaces being arranged in a spaced-apart manner along said first plane defined by the bottom surface, wherein:

each planar magnetic surface extends substantially parallel to the second plane defined by the at least one side surface of the container, and a magnetization vector of each planar magnetic surfaces is perpendicular to the respective planar magnetic surface; said arrangement of the at least two planar magnetic surfaces forms a cavity comprising a space between said at least two planar magnetic surfaces, said cavity being configured to accommodate a racemic mixture including different enantiomers and present a path for passing said racemic mixture therethrough, the magnetization vector of each of said at least two planar magnetic surfaces affects differently an interaction of the different enantiomers in the racemic mixture flowing through said path, and enables enantio-selective crystallization of each different enantiomer separately on a different magnetic surface of the at least two planar magnetic surfaces.

2. The system of claim 1, wherein each two planar magnetic surfaces of said at least two planar magnetic surfaces have opposite magnetization, one with respect to the other.

3. The system of claim 1, wherein, for each two planar magnetic surfaces of said at least two planar magnetic surfaces, a first planar magnetic surface is magnetized such that a north pole of the planar magnetic surface has the magnetization vector pointing towards the cavity, and a second planar magnetic surface is magnetized such that a south pole of the magnetic surface has the magnetization vector pointing towards the cavity.

4. The system of claim 1, comprising an inlet for inputting and an outlet for outputting the racemic mixture; said inlet and outlet being placed in planes perpendicular to a plane defined by the at least one planar magnetic surfaces.

5. The system of claim 1, comprising a pump being configured and operable to control a flow of the racemic mixture along said path.

6. The system of claim 1, comprising at least one temperature controller being configured and operable to control at least one of temperature of the racemic mixture or temperature of the planar magnetic surfaces.

7. The system of claim 1, wherein said cavity comprises a separating structure being configured to separate the cavity into two sub-channels, wherein said separating structure has another surface being configured to attract an enantiomer and enable crystallization thereof on the another magnetic surface.

8. The system of claim 1, wherein said planar magnetic surfaces comprises ferromagnetic or paramagnetic substrates being magnetized.

9. The system of claim 1, wherein said planar magnetic surfaces are structured with a roughness and configured to increase the enantio-selective crystallization of the enantiomers.

10. A method for flow crystallization, the method comprising:

providing the system of claim 1 providing a racemic mixture including different enantiomers, and flowing the racemic mixture along said path, comprising a cavity comprising a space between the two substantially parallel planar magnetic surfaces, thereby providing that the magnetization vector of each the two substantially parallel planar magnetic surfaces affects an interaction of different enantiomers in the racemic mixture differently to enable crystallization of each different enantiomer on a different planar magnetic surface of said two substantially parallel planar magnetic surfaces.

11. The method of claim 10, comprising controlling a flow of the racemic mixture along said path.

12. The method of claim 10, comprising controlling a temperature of the racemic mixture and/or at least one of the two substantially parallel planar magnetic surfaces.

13. The method of claim 10, wherein said flowing of the mixture through the path is performed continuously.

14. The method of claim 10, further comprising dissolving crystals on the two substantially parallel planar magnetic surfaces.

15. The method of claim 14, wherein dissolving crystals on the two substantially parallel planar magnetic surfaces comprises flowing a solvent therein to enable interaction with one of the two substantially parallel planar magnetic surfaces; changing the orientation of the path and flowing the solvent therein to enable interaction with the other of said two substantially parallel planar magnetic surface.

16. The method of claim 14, wherein dissolving crystals on the two substantially parallel planar magnetic surfaces comprises providing a separating structure being configured to separate the path into two sub-channels and dissolving crystals on the separating structure.

* * * * *